(12) United States Patent
Chin

(10) Patent No.: US 9,188,793 B2
(45) Date of Patent: *Nov. 17, 2015

(54) EYEWEAR HAVING ANGLE ADJUSTABLE NOSE PADS

(71) Applicant: ASWAN INTERNATIONAL CORP., Taipei (TW)

(72) Inventor: Meng-Hsien Chin, Taipei (TW)

(73) Assignee: ASWAN INTERNATIONAL CORP., Taipei (TW)

( * ) Notice: Subject to any disclaimer, the term of this patent is extended or adjusted under 35 U.S.C. 154(b) by 14 days.

This patent is subject to a terminal disclaimer.

(21) Appl. No.: 14/159,065

(22) Filed: Jan. 20, 2014

(65) Prior Publication Data

US 2015/0205144 A1    Jul. 23, 2015

(51) Int. Cl.
*G02C 5/12* (2006.01)

(52) U.S. Cl.
CPC ............ *G02C 5/122* (2013.01); *G02C 2200/18* (2013.01)

(58) Field of Classification Search
CPC .......... G02C 5/12; G02C 5/122; G02C 5/124; G02C 5/126
USPC ..................................................... 351/136–138
See application file for complete search history.

(56) References Cited

U.S. PATENT DOCUMENTS

| 6,793,337 | B1 * | 9/2004 | Lin | 351/80 |
| 7,591,555 | B1 * | 9/2009 | Chen | 351/137 |
| 2009/0021691 | A1 * | 1/2009 | Yang | 351/137 |
| 2015/0049298 | A1 * | 2/2015 | Chen | 351/137 |

* cited by examiner

*Primary Examiner* — Huy K Mai
(74) *Attorney, Agent, or Firm* — Li & Cai Intellectual Property (USA) Office

(57) ABSTRACT

An eyewear having angle adjustable nose pads includes a main body and a pair of nose pads. The main body has a nose pad frame. The nose pad frame has two pad arms, corresponding to two sides of a nose bridge, extending therefrom. The two pad arms each has peripheral portions defining a through hole, and two oppositely arranged peripheral portions each have a plurality of grooves arranged thereon. The nose pads and the two pad arms are correspondingly coupled. The nose pads each includes a padding, a plurality of latching members extended from the padding, and two stoppers respectively arranged on outer sides of two latching members. The latching members of the nose pads pass through a side of a pad arm through a through hole and couple to the other side of the pad arm. The two stoppers of each nose pad correspondingly abut two grooves.

10 Claims, 9 Drawing Sheets

EYEWEAR HAVING ANGLE ADJUSTABLE NOSE PADS

BACKGROUND OF THE INVENTION

1. Field of the Invention

The instant disclosure relates to an eyewear; in particular, to an eyewear with angle adjustable nose pads.

2. Description of Related Art

For eyewear, a pair of nose pads typically conforms to the shape of a nose bridge and has a pre-determined tilting angle, such that the nose pads are fittingly disposed on a user's nose bridge for supporting the eyewear. Conventional eyewear uses a metal support strip to secure the nose pads to the lens frame in order to provide support and stability to the nose pads via the strength of the metal material.

Once the metal support strip underwent various degrees of deformation, adjusting the metal support strip back to the original state is quite difficult, and user often cannot repair immediately. In order to reduce deformation and maintain the relative flexibility of the metal support strip due to external impact or frequent usage, users often seek professional help or tools, making the eyewear inconvenient to use. Moreover, the nose pad can be integrally formed with the lens frame to resolve nose pads deformation. However, integrally formed nose pads are typically not adjustable such that users cannot adjust the nose pads according to the shape of the nose bridge.

Since the center of gravity of a typical eyewear is exerted on a nose bridge via nose pads, if the nose pads cannot conformingly abut the slanted nose bridge, users are likely to experience distress or dizziness after prolong periods of use.

To address the above issues, the inventor strives via associated experience and research to present the instant disclosure, which can effectively improve the limitation described above.

SUMMARY OF THE INVENTION

The object of the instant disclosure is to provide an eyewear with angle adjustable nose pads. Via the freely adjustable nose pads, a user can accordingly adjust the nose pads to the most preferred slanted angle corresponding to a bridge of the user's nose, and in turn provide users with the most preferred stability, fitting, and convenience of immediate-adjustments.

In order to achieve the aforementioned objects, according to embodiments of the instant disclosure, an eyewear with angle adjustable nose pads is provided. The eyewear includes a main body. The main body has a nose pad frame. The nose pad frame has two pad arms, corresponding to two sides of a nose bridge, extending therefrom. The two pad arms each has peripheral portions defining a through hole, and two oppositely arranged peripheral portions each have a plurality of grooves arranged thereon. The nose pads and the two pad arms are correspondingly coupled. The nose pads each includes a padding, a plurality of latching members extended from the padding, and two stoppers respectively arranged on outer sides of two latching members. The latching members of the nose pads pass through a side of a pad arm through a through hole and couple to the other side of the pad arm. The two stoppers of each nose pad correspondingly abut two grooves.

The instant disclosure has the following improvements. The nose pads of the instant disclosure can be angularly adjusted to conform to various shapes of nose bridges via the selectivity of the positions of the stoppers relative to the positions of the grooves on the nose frame pad. Moreover, the pair of nose pads of the instant disclosure is individual elements, so that the nose pads can be adjusted to conform to the sides of a nose bridge. Furthermore, the instant disclosure can also include a support member sleeved onto the paddings of the nose pads. Due to the materials and design of the support member, comfort and conformity are further improved when using the eyewear. Specifically, the pair of nose pads can be coupled onto the nose pad frame to provide ease of assembly and detachment, reduced probability of deformation due to impact, and convenience of being able to immediately adjust the angle of the nose pads, and in turn, the most preferred conformity and comfort. When the nose pads are damaged or loosened, the nose pads can be renewed by replacing the individually detachable nose pads.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

Figure 1:
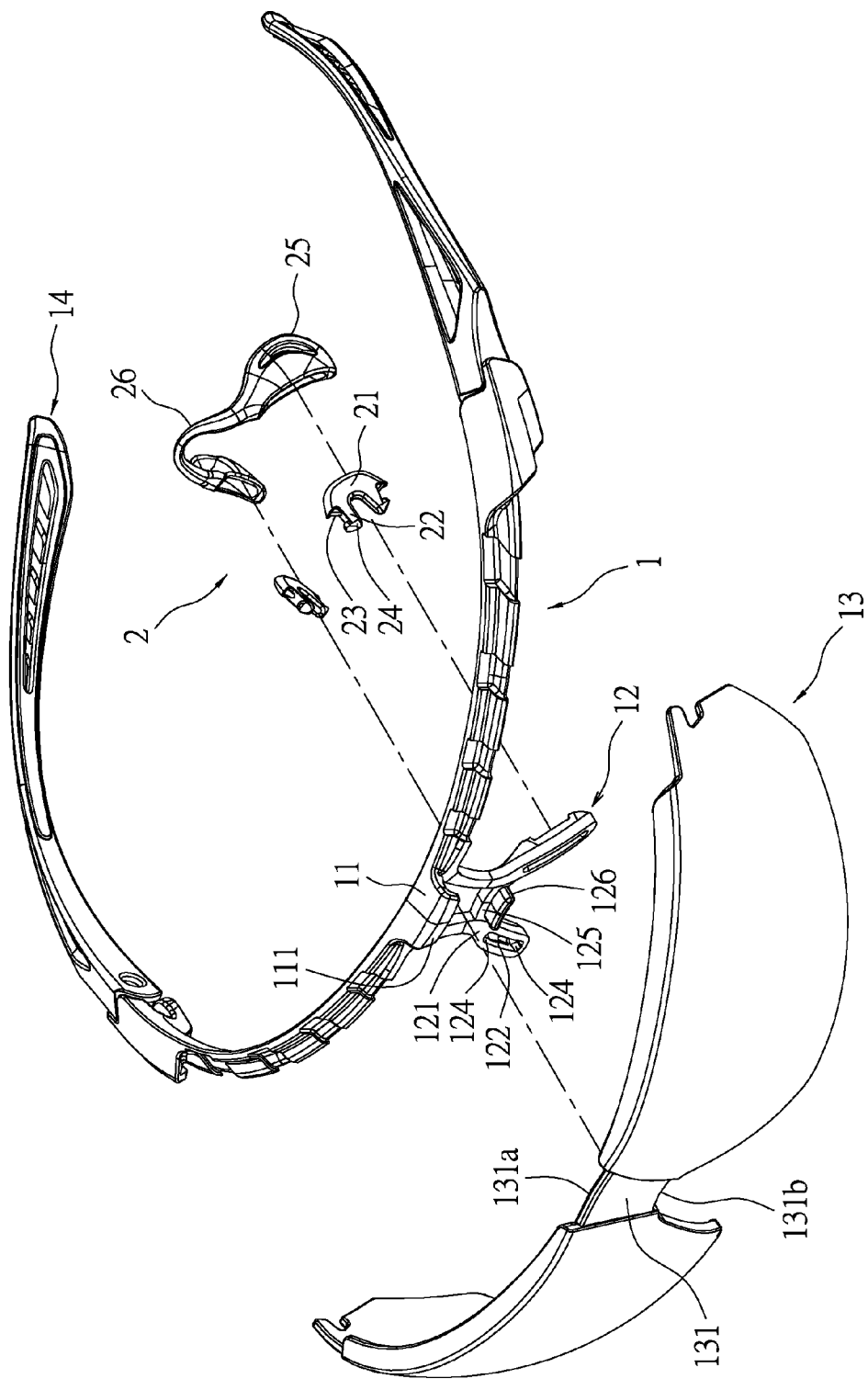
FIG. 1 is an exploded view of an eyewear having angle adjustable nose pads in accordance with a preferred embodiment of the instant disclosure.
Figure 2:
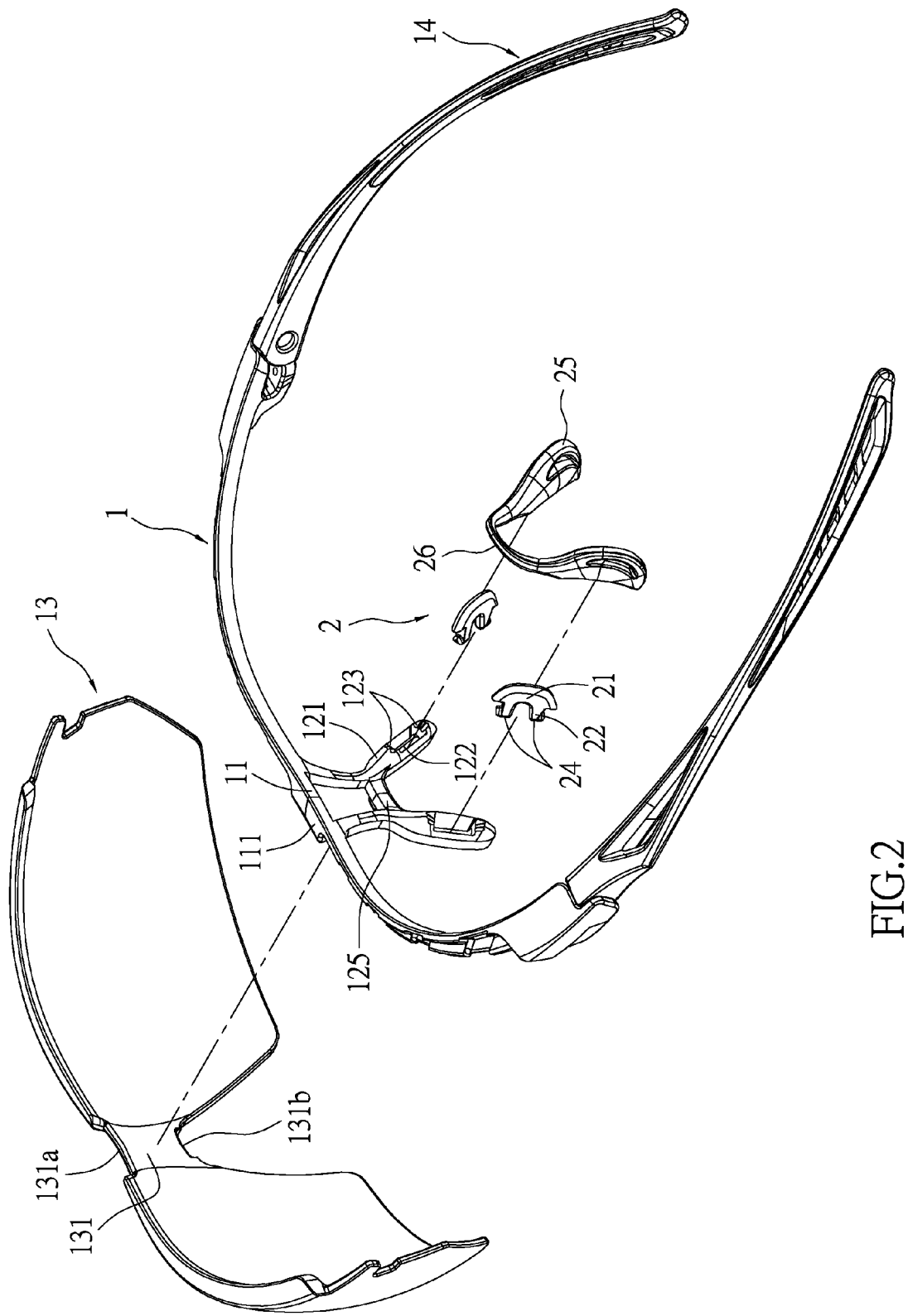
FIG. 2 is another exploded view of the eyewear having angle adjustable nose pads in accordance with a preferred embodiment of the instant disclosure.
Figure 3:
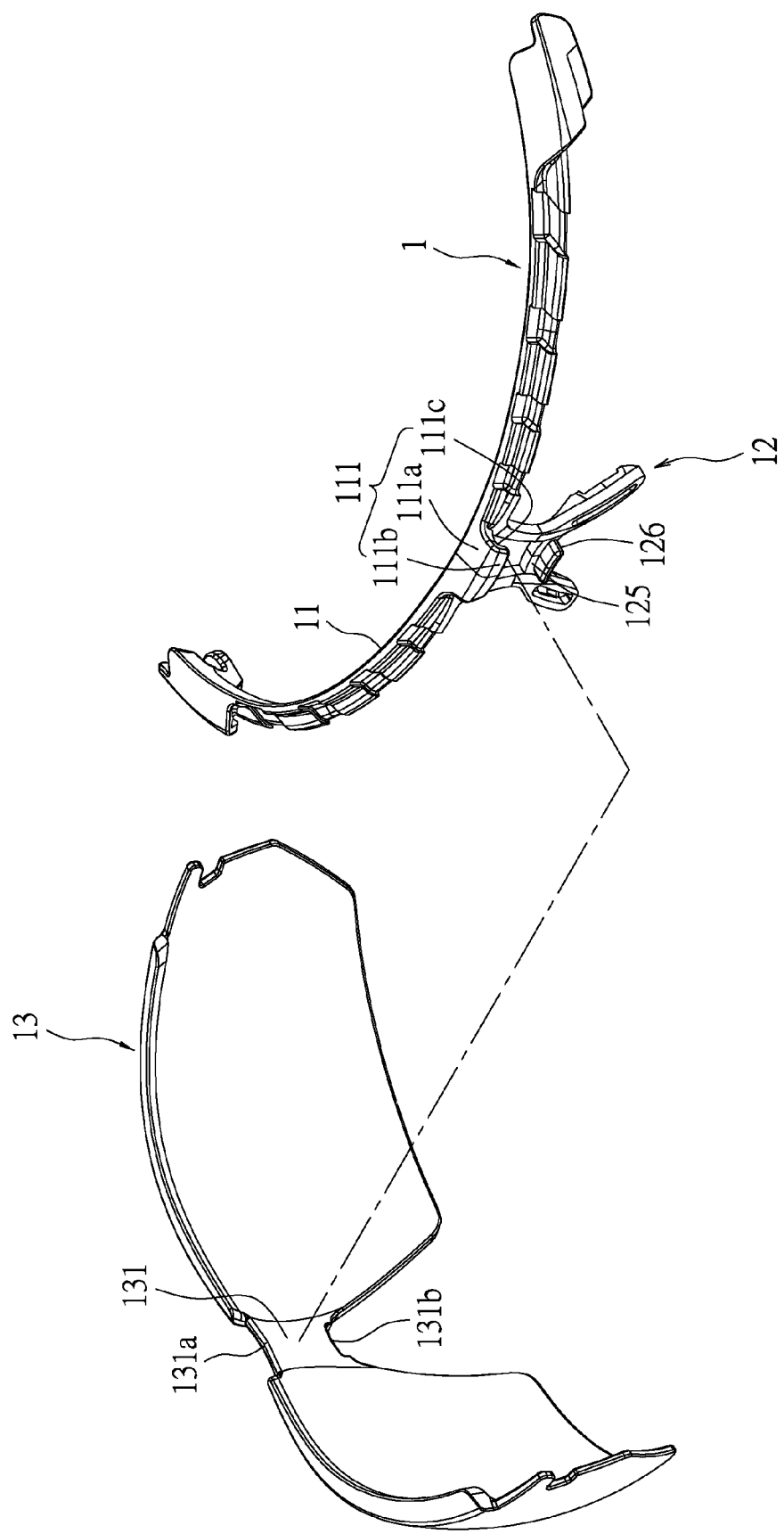
FIG. 3 is another exploded view of the eyewear having angle adjustable nose pads in accordance with another preferred embodiment of the instant disclosure.

Please refer to FIGS. 1 to 3. Each illustrates an exploded view of an eyewear having angle adjustable nose pads in accordance with the instant disclosure. As shown in figures, the eyewear having angle adjustable nose pads includes a main body 1 and a pair of nose pads 2.

In the instant embodiment, the main body 1 includes a lens frame 11, a nose pad frame 12, a lens 13, and two temples 14. The lens frame 11 includes an engaging portion 111. The nose pad frame 12 is disposed at the center of the lens frame 11. The nose pad frame 12 and the engaging portion 111 are integrally formed with and extended from the lens frame 11. The nose pad frame 12 and the engaging portion 111 are substantially normal to one another in configuration.

Furthermore, the nose pad frame 12 includes a pair of pad arms 121, a bridging member 125 and a fixing seat 126.

Specifically, the pair of pad arms 121 respectively extends away from the direction of the lens frame 11 and corresponds to two sides of the bridge of a nose for the pair of paddings 2 to be installed on the pad arms 121. On one side of each pad arm 121 has peripheral portions defining a through hole 122 therein. Two peripheral portions opposite one another have a plurality of grooves 123 (as shown in FIG. 2) arranged thereon. On an opposite side of each pad arm 121 has two accommodating slots 124 arranged thereon. The bridging member 125 connects between the pair of pad arms 121. The fixing seat 126 protrudes from the bridging member 125 for fitting the lens 13 thereon.

The lens 13 has a fixing plate 131 arranged at a center portion thereon. The fixing plate 131 has an upper recessed edge 131a and a lower recessed edge 131b. The upper recessed edge 131a correspondingly couples to the engaging portion 111 of the main body 1 whereas the lower recessed edge 131b correspondingly couples to the fixing seat 126 of the nose pad frame 12. Moreover, the engaging portion 111 of the lens frame 11 includes a support plate 111a and a retaining tab 111b arranged normal to the support plate 111a. The support plate 111a and the retaining tab 111b cooperatively define a retaining accommodating slot 111c for disposing the lens 13 in the lens frame 11.

Two temples 14 are respectively coupled to two ends of the lens frame 11 via conventional latching, screwing, embedding or pivoting mechanisms such that the temples 14 can freely pivot.

The pair of nose pads 2 each includes a padding 21, a plurality of latching members 22 and a plurality of stoppers 23. Two paddings 21 and two stoppers 23 are included in the instant embodiment, but is not limited to the example provided herein. Specifically, the pair of latching members 22 extends from a side of the padding 21 to correspondingly couple to the pad arm 121 in the through hole 122. Each latching member 22 has a protrusion 24 arranged on an end thereof corresponding to the accommodating slot 124. The latching member 22 and the protrusion 24 together resemble the shape of a hook. The pair of stoppers 23 is disposed on respective lateral portions of the pair of latching members 22 for abutting the grooves 123.

Figure 4:
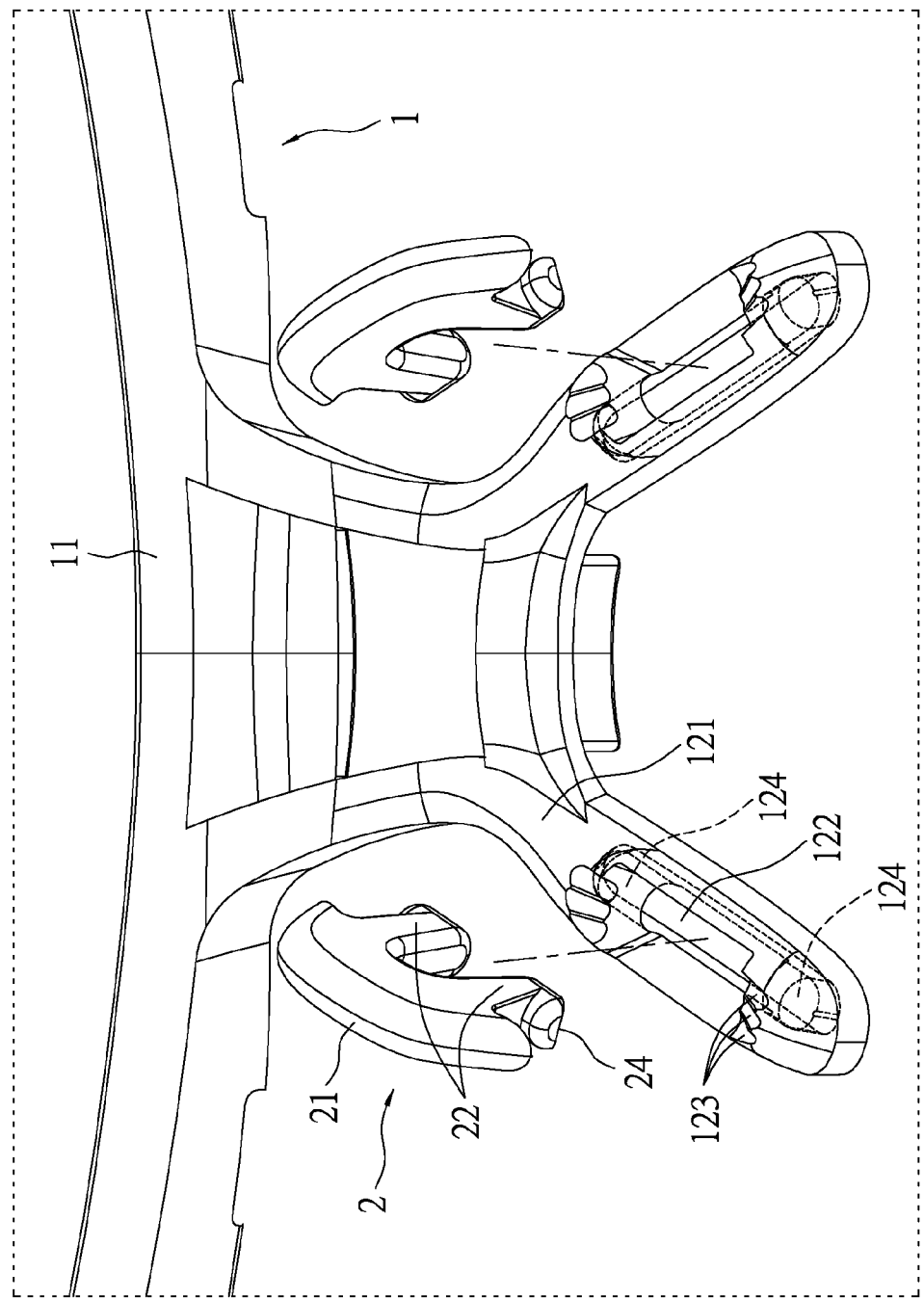
FIG. 4 is a close-up view of a nose pad frame and nose pads in accordance with a preferred embodiment of the instant disclosure.

Please refer to FIG. 4 as the close-up view of a nose pad frame and nose pads in accordance with the instant disclosure. Three grooves 123 are provided in the instant embodiment. The grooves 123 have a specific curvature. The three grooves 123 are arranged in juxtaposition on each peripheral portion such that each groove on one peripheral portion aligns with another groove on the oppositely arranged peripheral portion of the pad arm 121. Moreover, the two stoppers 23 and the grooves 123 have substantially the same corresponding curvatures. Each of the two protrusions 24 resembles a rounded ridge that corresponds to the shape of the two accommodating slots 124.

Notably, the grooves 123 of the instant embodiment are not limited hereto, the available positions for adjusting the nose pad 2 are based on the quantity of grooves 123 provided. In other words, angle and magnitude of the nose pad 2 can be adjusted according to the quantity of the grooves and the preferred configuration.

In another embodiment, the pair of nose pads 2 also includes a support member 25 (as shown in FIG. 1) and a slot corresponding to the padding 21, such that the support member 25 can be detachably coupled over the padding 21. The support member 25 is a half-moon shaped structure. The support member 25 is made of typical polymer materials such as silicon, polybutylene terephthalate (PBT), polypropylene (PP), nylon (Nylon), styrene-butadiene copolymer (SBC), or styrene-butadiene-styrene copolymer (SBS), etc. The support member 25 is coupled to the padding 21 via adhesives or coupling methods. The shape, materials, and the coupling of the support member 25 to the padding 21 are not limited hereto. As a result, the support member 25 is replaceable if damaged or not suitable for use.

Since the nose pad 2 has a relatively small overall volume, the two support members 25 in the instant embodiment can be bridged by a connecting member 26 therebetween, such that when one nose pad 2 attached to another nose pad 2 detaches, the two nose pads 2 are mutually connected to prevent from getting lost. The connecting member 26 can be made of soft or hard materials such that nose pads 2 adjustments are not obstructed.

Please refer to FIG. 3 for the installment of the main body 1 to a lens 13. The upper recessed edge 131a of the fixing plate 131 is inserted to the retaining slot 111c of engaging portion 111, such that the upper recessed edge 131a abuts a bottom side of the fixing plate 131 and the fixing plate 131 is securely coupled in the retaining slot 111c via the retaining tab 111b. The lower recessed edge 131b presses against a top portion of the fixing seat 126, and two ends of the lens 13 is inserted into side end portions of the main body 1. The lens 13 is coupled to the main body 1 by clamping the fixing plate 131 between the engaging portion 111 and the fixing seat 126 to prevent the lens 13 from swaying and sliding around.

Figure 5:
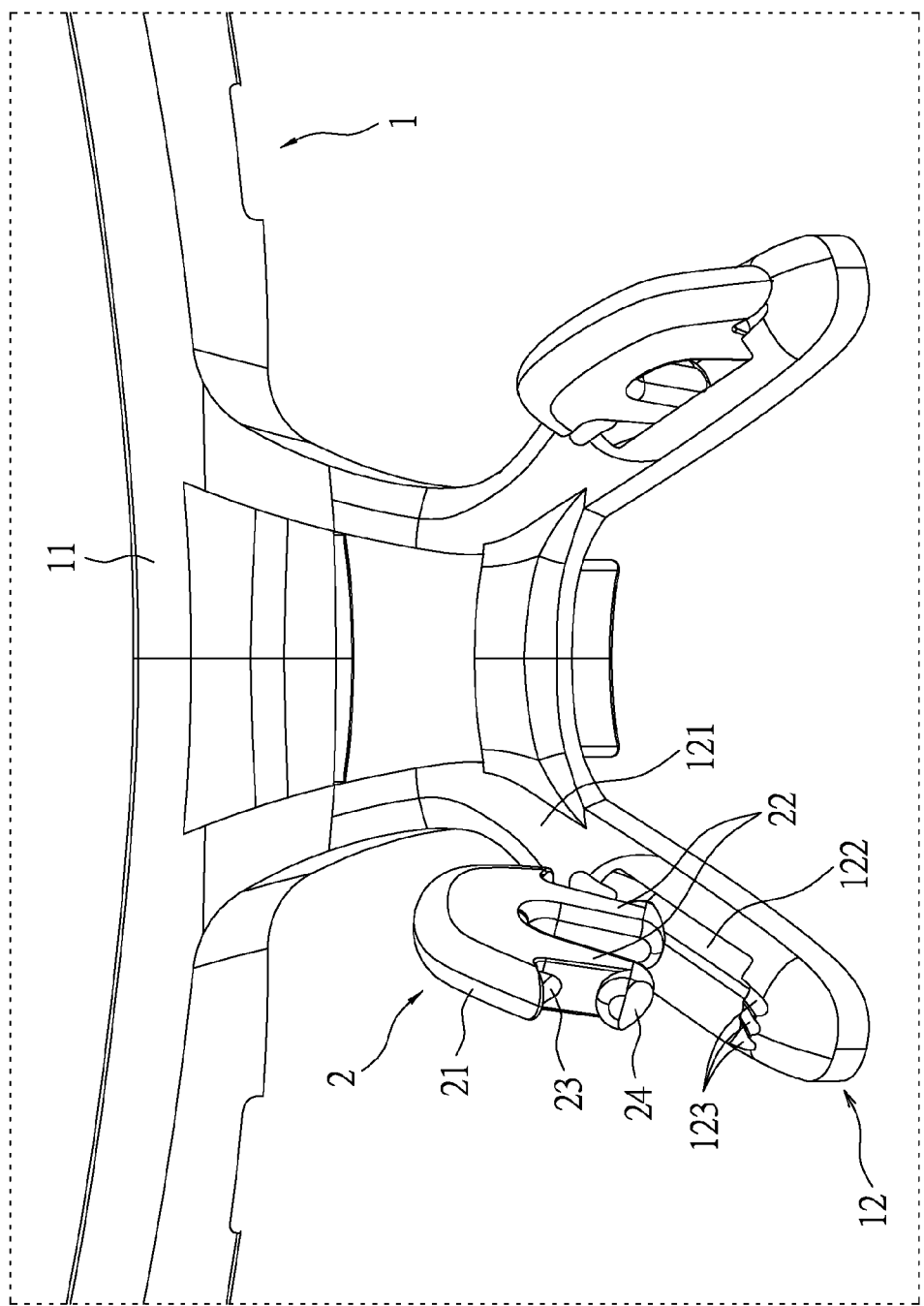
FIG. 5 is an assembled view of the eyewear having angle adjustable nose pads in accordance with a preferred embodiment of the instant disclosure.
Figure 6:
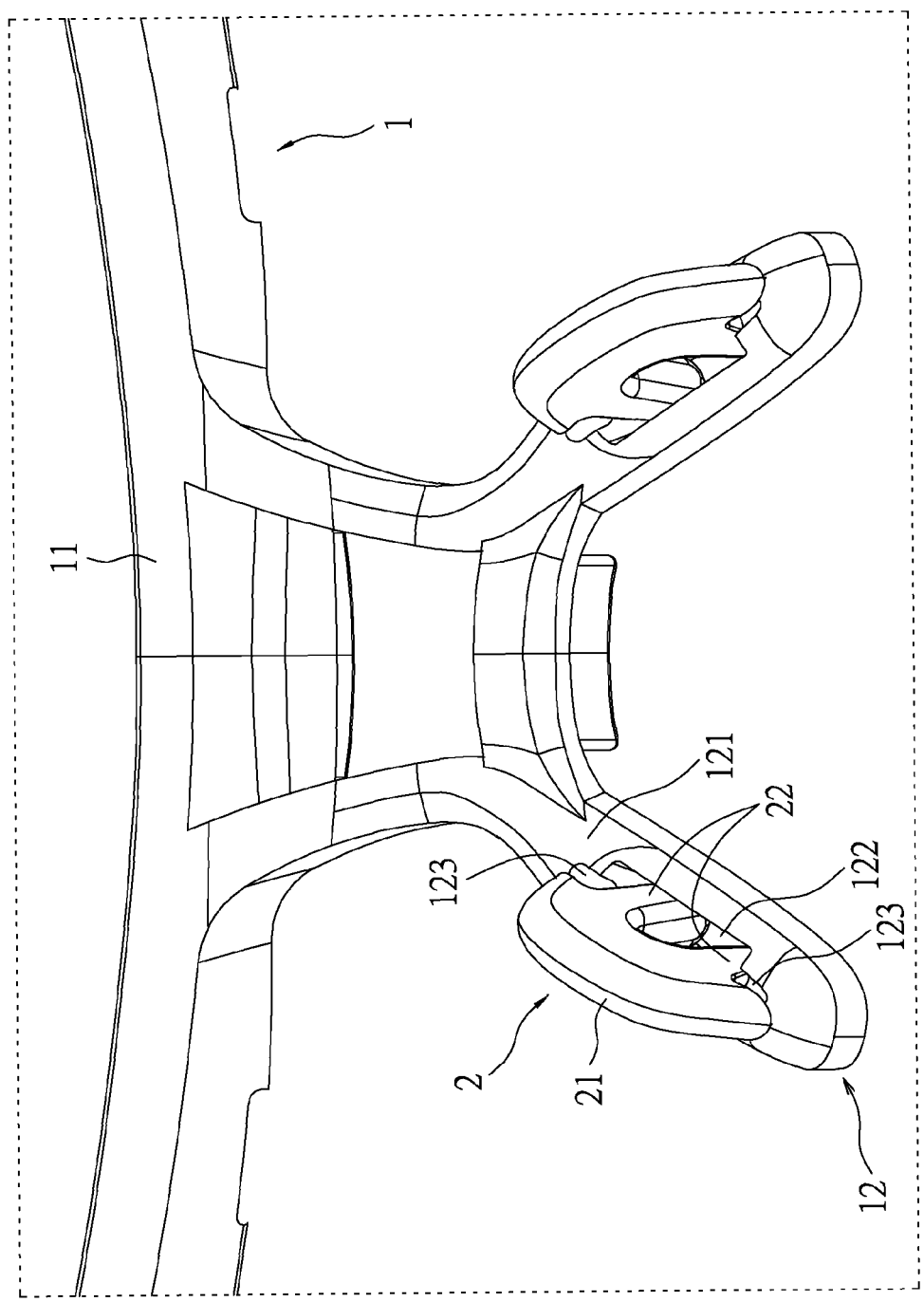
FIG. 6 is another assembled view of the eyewear having angle adjustable nose pads in accordance with a preferred embodiment of the instant disclosure.

Please refer to FIGS. 5 and 6 as the assembled views of the eyewear having angle adjustable nose pads in accordance with the instant disclosure. During the assembly of the instant disclosure, as shown in FIG. 5, the nose pads 2 are tilted, such that one of the latching members 22 passes through the through hole 122 from a side of the pad arm 121 having the grooves 123. The protrusion 24 is correspondingly coupled into the accommodating slot 124 arranged on another side of the pad arm 121. The protrusion 24 of the other latching member 22 passes through the through hole 122 and couples to the corresponding accommodating slot 124, such that the two nose pads 2 are coupled to the nose pad frame 12 (as shown in FIG. 6) and the two stoppers 23 of the nose pads 2 abut two corresponding grooves 123. After the nose pads 2 are coupled to the nose pad frame 12, the correspondingly molded protrusions 124 can freely rotate within the accommodating slots 124. The two stoppers 23 selectively abut any two opposite grooves 123 via the paddings 21 of the nose pads 2 to provide adjustments to the nose pads 2.

Notably, each protrusion 24 has a bottom slanted surface (as shown in FIG. 5) to prevent portions of the pad arm 121 defining the through hole 122 from obstructions when the protrusions 24 is inserted into the accommodating slots 124. Moreover, the pair of nose pads 2 is individual elements for replacement. In other words, each nose pad 2 is detachably coupled to the nose pad frame 12 when either one or both the nose pads 2 are damaged, unable to couple or are loosen.

Figure 7:
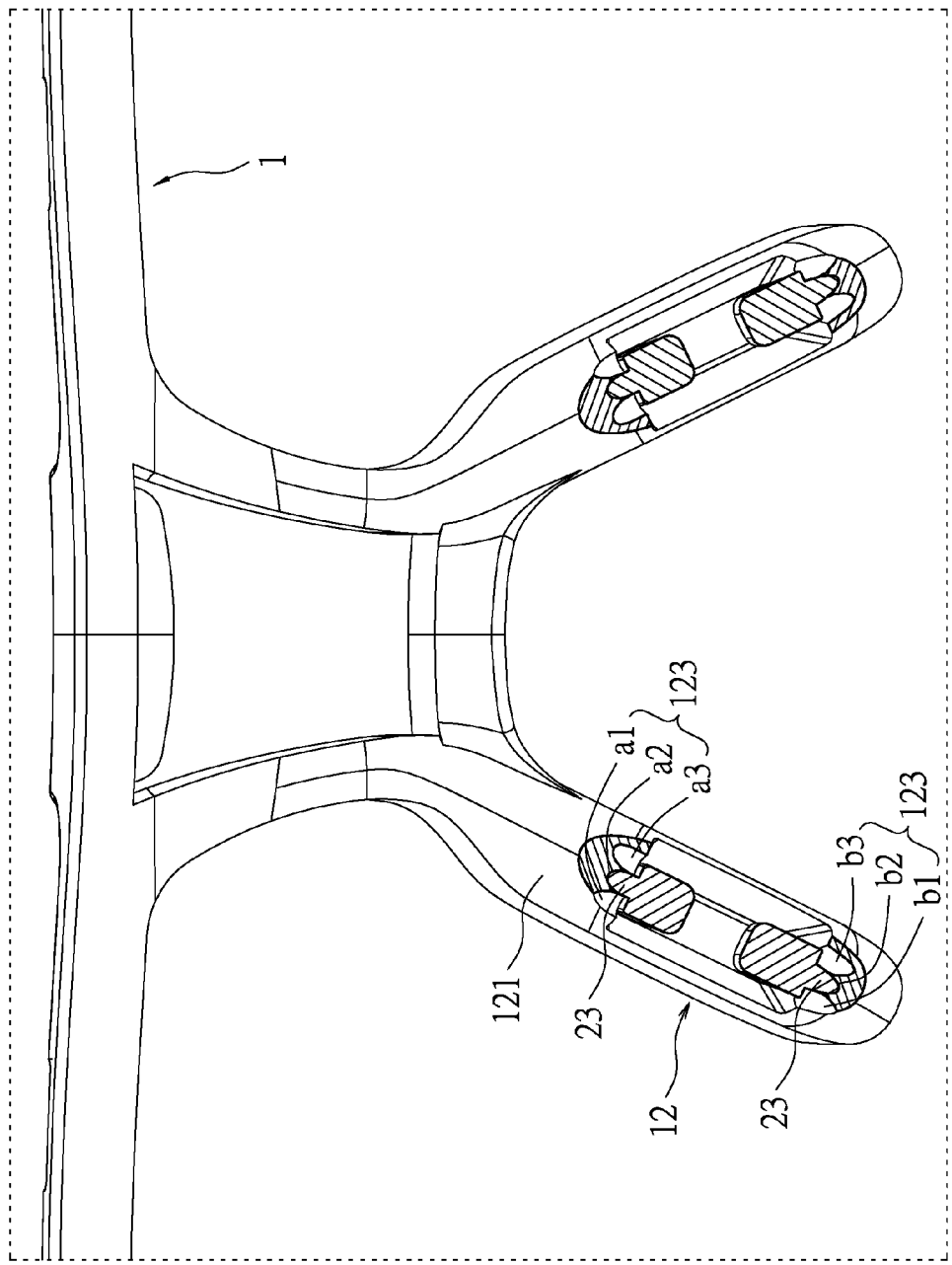
FIGS. 7 to 9 are schematic diagrams illustrating the operating modes of the eyewear having angle adjustable nose pads in accordance with a preferred embodiment of the instant disclosure.
Figure 8:
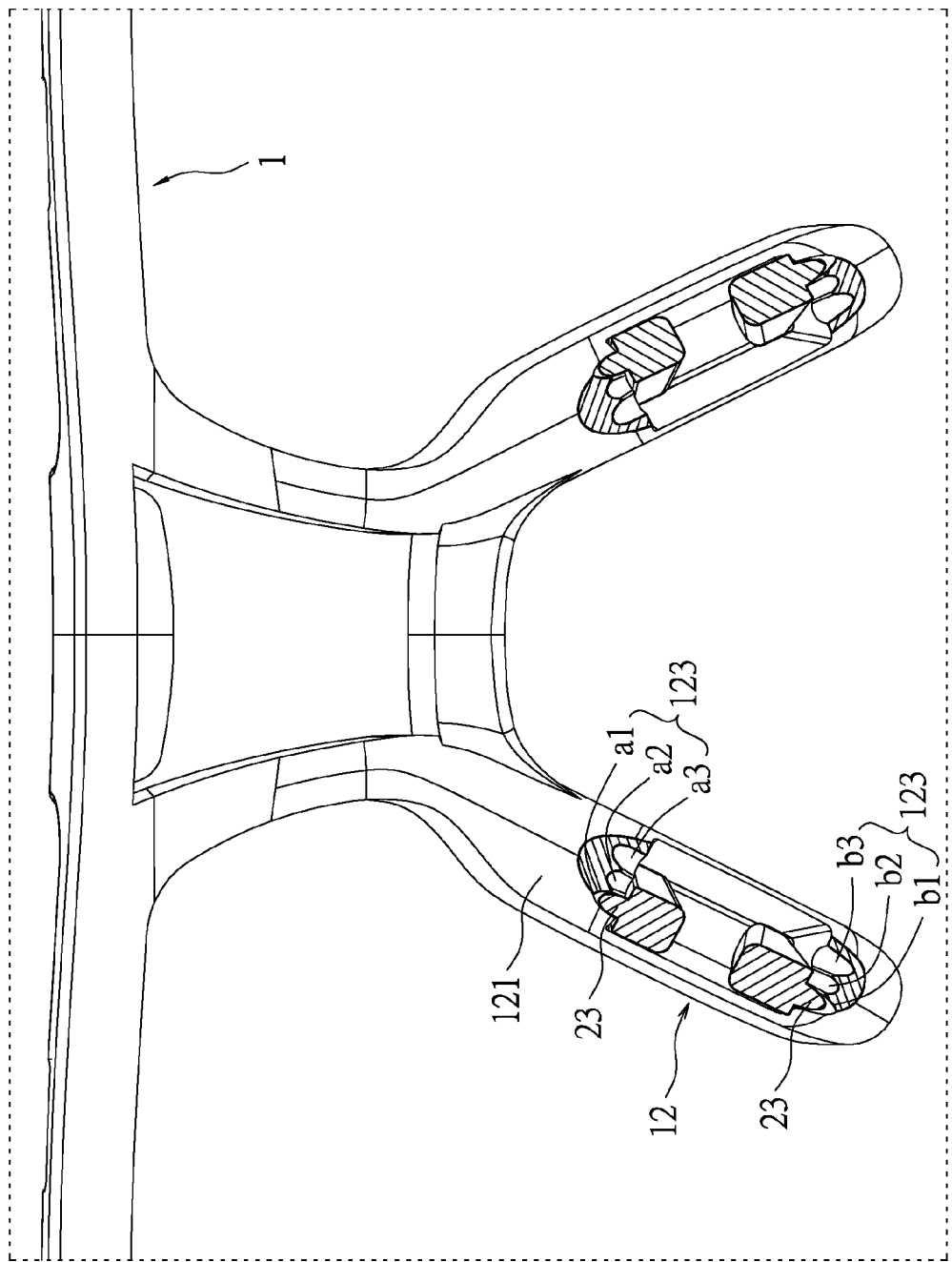
Figure 9:
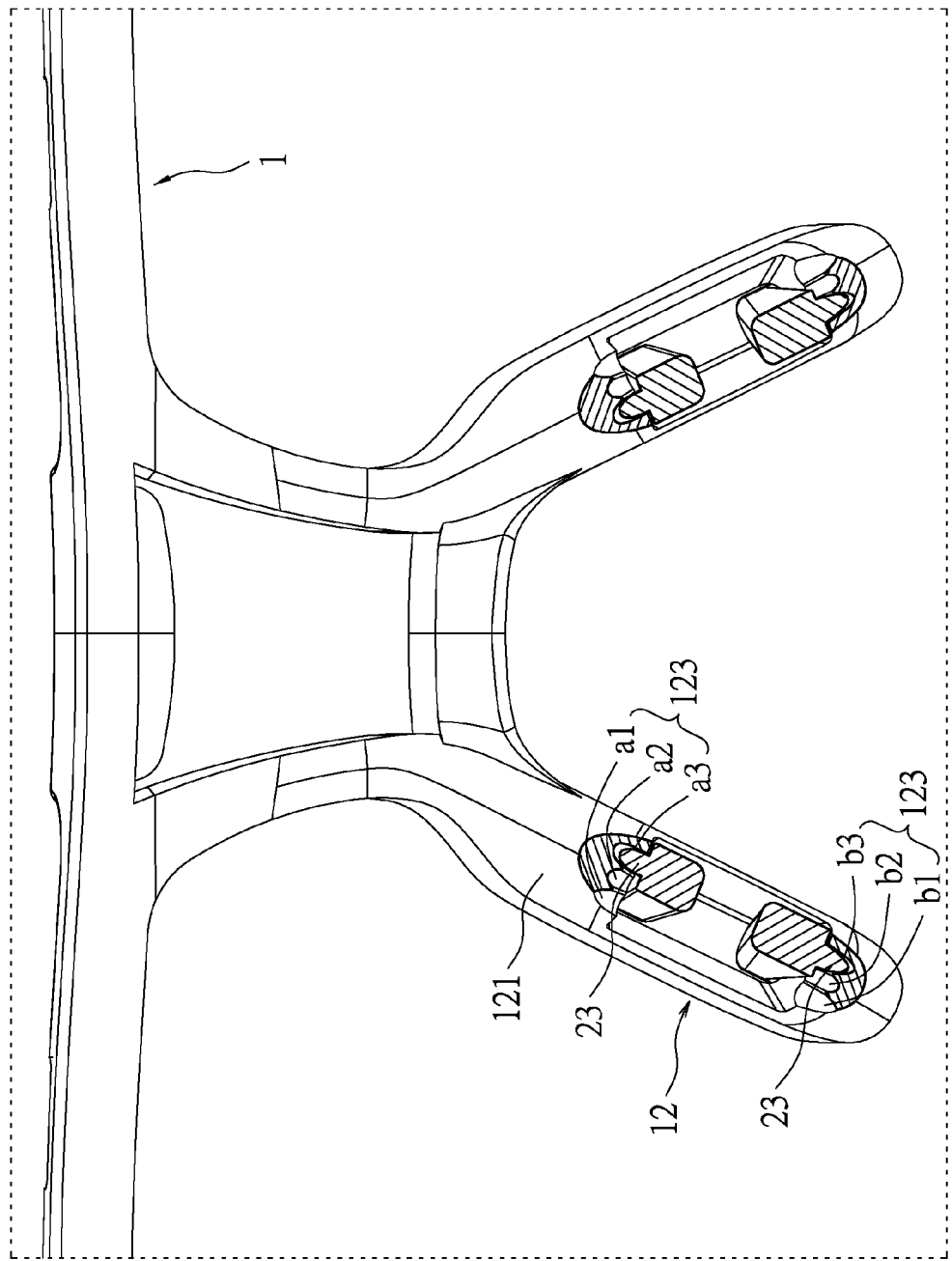

Please refer to FIGS. 7 to 9 as the schematic diagrams illustrating the operating modes of the nose pads 2 with respect to the eyewear having angle adjustable nose pads according to the instant disclosure. As shown in FIG. 7, the three grooves a1, a2, a3 (labeled from left to right) are arranged on the top peripheral portion of the left pad arm 121, whereas the three grooves b1, b2, b3 (labeled from left to right) are arranged on the bottom peripheral portion of the left pad arm 121. Moreover, lower half portions of the nose pads 2 are cut and removed from the diagrams in order to provide unobstructed partial cross-section between the nose pads 2 and the grooves 3.

In an embodiment as shown in FIG. 8, users can outwardly push against two sides of the nose pads 2 simultaneously in order to slantingly adjust the nose pads 2 away from the center of the nose pad frame 12. Specifically, when users push the padding 21 of the right nose pad 2 away from the other side of the nose pad 2, the two stoppers 23 of the nose pad 2 can be simultaneously moved from the original grooves a2, b2 positions to the grooves a1, b1 positions. Similarly, the padding 21 of the right nose pad 2 can be pushed from the left side. In other words, after pushing the padding 21 of the right nose pad 2 away from the other side of the nose pad 2, the two stoppers 23 of the nose pad 2 can be simultaneously moved from the original grooves 123 positions to the positions where the grooves 123 are located on the right.

In another embodiment as shown in FIG. 9, users can adjust the nose pads 2 in opposite direction from the nose pads 2 in the previous embodiment. The two stoppers 23 can be simultaneously moved from the positions of the grooves a2, b2 to the grooves a3, b3 by pushing the padding 21 of the left nose pad 2 towards the other side of the nose pad 2. The two stoppers 23 can be simultaneously moved to the left positions of grooves 123 by pushing the padding 21 of the right nose pad 2 towards the other side of the nose pad 2, such that two sides of the nose pad 2 can tilt toward the center of the nose pad frame 12.

Specifically, the previous embodiment are most preferred with a half-opened eyewear frame as an example, but the instant disclosure is not limited to the exemplary shape of the eyewear frame. The nose pad frame 12 is not only limited to be connected to the lens frame 11, the nose pad frame 12 can also be fixed at the center of the lens 13. The nose pad 2 is assembled to the nose pad frame 12 via coupling as aforementioned to provide angle adjustments of the nose pads. In another embodiment, the eyewear having angle adjustable nose pads in accordance with the instant disclosure can also be a frameless eyewear.

In summary, the assembly of the nose pad 2 and the nose pad frame 12 of the instant disclosure are applicable to eyewear frames of the various shapes and functions. If the relative positions between the eyewear and the lens are inappropriate such that the paddings 21 cannot conform to the bridge of a nose, user may feel distress in the eyes due to the lack of focus. Accordingly, users can adjust the padding 2 to suitable positions as disclosed above in order to conform to the bridge of the nose which may improve the above situation. Moreover, since the nose pads 2 of the instant disclosure are individual elements, one individual nose pad 2 can be adjusted to conform to various shapes of nose bridges or other needs.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. An eyewear having angle adjustable nose pads, comprising:
   a main body having a nose pad frame, the nose pad frame having two pad arms extending therefrom, the pad arms corresponding to a bridge of a nose, each of the pad arms having peripheral portions defining a through hole therein, two peripheral portions opposite one another having a plurality of grooves arranged thereon; and
   a pair of nose pads respectively coupled to the two pad arms, each of the nose pads including a padding, the padding having a plurality of latching members extending therefrom, the latching members having two stoppers arranged on a lateral portion thereof, the latching members of the pair of nose pads passing through the through hole from a side of each pad arm and coupled to another side of the pad arm, two stoppers of each nose pad correspondingly abutting two of the grooves.

2. The eyewear having angle adjustable nose pads as recited in claim 1, wherein the each of the nose pads includes a support member detachably coupled to the padding.

3. The eyewear having angle adjustable nose pads as recited in claim 2, wherein each of the nose pads further comprising:
   a connecting member bridged between the two support members.

4. The eyewear having angle adjustable nose pads as recited in claim 1, wherein the grooves are arranged in juxtaposition on each peripheral portion such that each groove on one peripheral portion aligns with another groove on the oppositely arranged peripheral portion.

5. The eyewear having angle adjustable nose pads as recited in claim 4, wherein the latching members having two stoppers arranged on a lateral portion thereof are movable from two oppositely arranged grooves to another two oppositely arranged grooves by pushing against the padding.

6. The eyewear having angle adjustable nose pads as recited in claim 1, wherein each pad arm has two accommodating slots correspondingly arranged on a side thereof opposite to the grooves, the two accommodating slots are air communicable with the through hole.

7. The eyewear having angle adjustable nose pads as recited in claim 6, wherein two latching members each have an end, the end has a protrusion arranged thereon corresponding to the accommodating slot.

8. The eyewear having angle adjustable nose pads as recited in claim 1, wherein the main body includes a lens, the nose pad frame is configured at a center portion of the lens.

9. The eyewear having angle adjustable nose pads as recited in claim 1, wherein the main body includes a lens frame and a lens coupled to the lens frame, the nose pad frame is disposed at a center of the lens frame.

10. The eyewear having angle adjustable nose pads as recited in claim 9, wherein the nose pad frame is disposed at a middle portion of the lens.

\* \* \* \* \*